United States Patent [19]

Cook

[11] Patent Number: 4,759,497
[45] Date of Patent: Jul. 26, 1988

[54] SYSTEM FOR HEATING AND STORING A LIQUID

[75] Inventor: Robert E. Cook, Kankakee, Ill.

[73] Assignee: Artesian Building Systems, Lafayette, Ind.

[21] Appl. No.: 870,797

[22] Filed: Jun. 5, 1986

[51] Int. Cl.[4] .............................. F23N 1/08; F24H 3/06
[52] U.S. Cl. .................................. 236/20 R; 237/8 R; 237/19
[58] Field of Search .......................... 237/19, 16, 8 R; 219/316, 328, 323; 122/17; 126/362, 428, 427; 236/20 R

[56] References Cited

U.S. PATENT DOCUMENTS 4,175,698 11/1979 Brosenius ............................. 237/19
4,254,636 3/1981 Zebuhr ................................ 126/427

FOREIGN PATENT DOCUMENTS 52761 3/1982 Japan .................................. 126/437

Primary Examiner—Henry A. Bennet
Attorney, Agent, or Firm—Neuman, Williams, Anderson & Olson

[57] ABSTRACT

A system is provided for heating and storing a liquid within a tank. Disposed within the tank is a heating unit which effects stratification of the tank into upper and lower liquid storage sections whereby the liquid in the upper storage section is at a first predetermined temperature which is higher than the temperature of the liquid within the lower storage section. A first control element is operatively connected to the heating unit and controls the operation thereof so as to maintain the liquid in the upper storage section at the first predetermined temperature. The upper and lower storage sections are interconnected by a passage assembly. The passage assembly includes a pump for effecting controlled circulation of the liquid from the upper storage section to the lower storage section. The operation of the pump is controlled by a second control element which is responsive to the temperature of the liquid in the lower storage section and thus, maintains a predetermined temperature differential between the liquids stored in the two tank sections. A liquid outlet communicates with at least one tank storage section and a liquid inlet communicates with at least one tank storage section.

8 Claims, 1 Drawing Sheet

U.S. Patent
Jul. 26, 1988
4,759,497
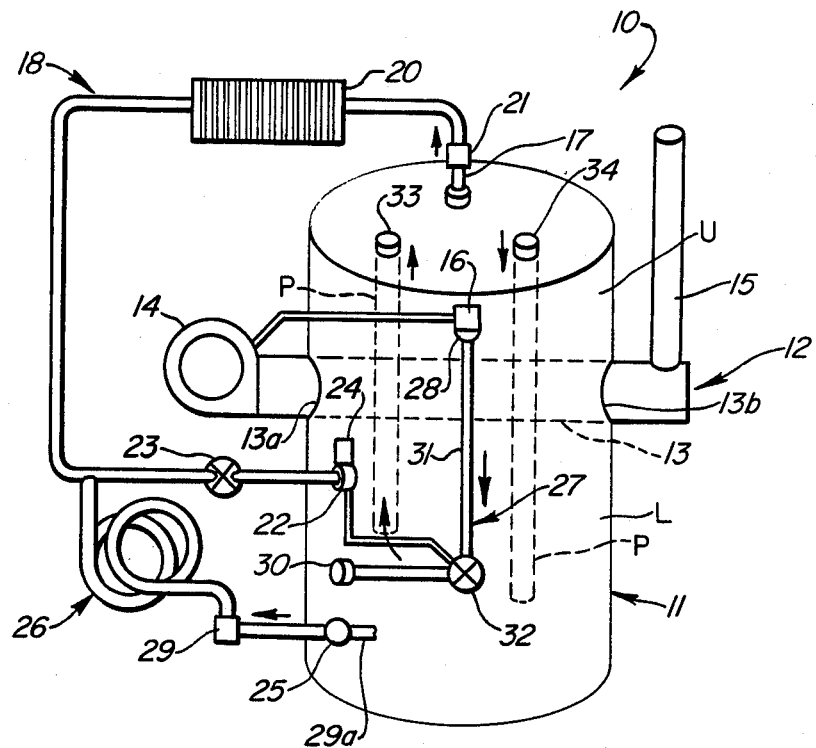
FIG. 1
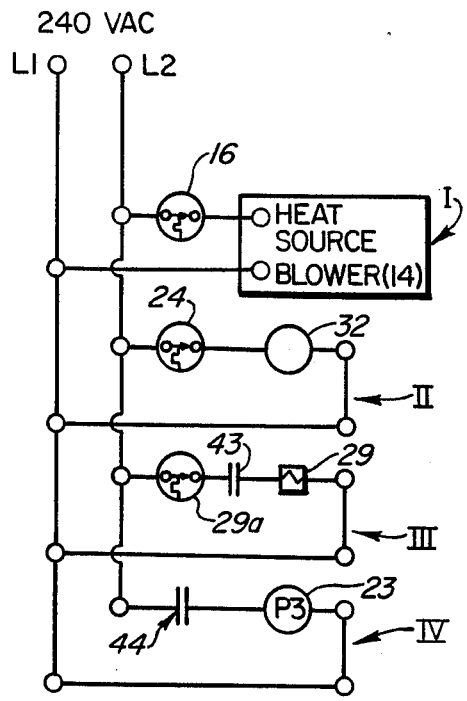
FIG. 2
FIG. 3

SYSTEM FOR HEATING AND STORING A LIQUID

BACKGROUND OF THE INVENTION

Various liquid storage and heating systems have heretofore been proposed; however, because of certain inherent design characteristics they are beset with one or more of the following shortcomings: (a) the system components are of bulky, costly and complex construction; (b) separate heating elements are required for both the upper and lower sections of the storage tank; (c) there is no controlled circulation of the liquid, accumulated in the upper storage section of the tank, with the liquid accumulated in the lower storage section of the tank; and (d) an inordinate amount of servicing and maintenance is required in order to maintain the system in proper working order.

SUMMARY OF THE INVENTION

Thus, it is an object of the invention to provide a system of heating and storing a liquid which avoids all of the aforenoted shortcomings.

It is a further object of the invention to provide a system which utilizes a single heating unit and yet effectively maintains simultaneously within a single tank liquid at two predetermined temperatures.

Further and additional objects will appear from the description, accompanying drawings and appended claims.

In accordance with one embodiment of the invention a system for heating and storing a liquid is provided which includes a storage tank and a heating means disposed therein and stratifying the interior thereof into upper and lower liquid storage sections. The liquid stored in the upper section is at a predetermined temperature which is higher than the temperature of the liquid stored in the lower section. A first control means is operatively connected to and controls the operation of the heating means so as to maintain the liquid in the upper storage section at the predetermined temperature. The upper and lower sections of the tank interior are interconnected by a passage assembly in which is disposed a circulating means. The circulating means effects controlled circulation of the liquid from the upper storage section to the lower storage section. The operation of the circulating means is responsive to a second control means which maintains a predetermined liquid temperature differential between the upper and lower storage sections. Liquid outlet means communicate with the tank interior sections and a liquid inlet means communicates with at least one of the storage sections. Each outlet means is provided with a thermostatically controlled valve means.

DESCRIPTION

For a more complete understanding of the invention reference should be made to the drawings herein:

BRIEF DESCRIPTION OF DRAWINGS

FIG. 1 is a fragmentary perspective side view of one embodiment of the improved system.

FIG. 2 is a wiring diagram for the system of FIG. 1.

FIG. 3 is a fragmentary perspective view of a modified embodiment of the improved system.

DETAILED DESCRIPTION OF DRAWINGS

Referring now to the drawing, a preferred embodiment of the improved system 10 is shown which because of its compact design is particularly suitable for use in single family residences and/or apartments. Due to the relative size of the various components of the system to be hereinafter described more fully, the system may be readily installed in a rather confining space (e.g. closets, etc.).

The system 10, as illustrated, includes an upright liquid storage tank 11 having a volumetric capacity of about 40 gallons. The tank capacity may be greater, if desired, and will depend upon the demand requirements for high temperature liquid (e.g., water). The exterior of the tank is provided with suitable insulation, not shown, and the interior surface is inert to the stored liquid.

Located within the upper two-thirds of the tank interior is a heating unit which effects stratification of the interior into an upper liquid storage section U and a lower liquid storage section L. The location of unit 12 within the tank interior will depend upon the relative demands for high and low temperature liquids. In most installations unit 12 is located such that the lower section L has a volumetric capacity approximately twice that of the upper section U.

The heating unit 12 in the illustrated embodiment includes an elongated cylindrical chamber 13 submerged within the liquid accumulated in the tank. The chamber extends diametrically across the tank interior and has the opposite ends thereof open to the exterior of the tank. The chamber is formed of suitable heat conductive, liquid impervious material (e.g. metal) which is inert to the liquid accumulated within the tank. Disposed within the chamber is a heat source (e.g. gas burner) and suitable baffling. Associated with the heat source and externally mounted on an intake end 13a of chamber 13 is a blower 14. Mounted on the opposite or outlet end 13b of chamber 13 is an exhaust vent 15. In some installations of the system, the heat from the exhaust gases may be partially recovered and utilized for supplemental heating purposes before the gases are discharged to the outside.

Where space limitations are encountered during installation of the improved system 10, it may be necessary to mount the blower on the outlet end 13b of the chamber rather than on the intake end 13a as shown. Where the blower is mounted on the chamber outlet end, the suction side of the blower communicates with the chamber, downstream of the heat source and the discharge side of the blower communicates with the exhaust vent 15.

In either type of blower installation, the heat source is thermostatically controlled by a thermostat 16 which senses the temperature of the liquid within the upper storage section U. The thermostat 16 is adjusted to maintain the liquid at a predetermined temperature (e.g. 170° F.).

As seen in FIG. 1, an outlet port 17 for high temperature liquid is provided on the upper end portion of the tank which communicates with the storage section U of the tank interior. The port 17 is connected to a primary piping system 18 for circulating hot water through the residence or apartment. Included within the piping system may be a space heater 20 in the form of a conventional water-to-air heat exchanger. Also included in the piping system is a thermostatically controlled valve 21. The thermostat, not shown, for controlling valve 21 is at a predetermined location within the residence or apartment.

The discharge end of the piping system is connected to an inlet port 22 provided on tank 11 and in communication with the lower storage section L. Circulation of the hot water through the piping system 18 is effected by pump 23. The operation of pump 23 may be controlled by the aforenoted thermostat, not shown, which regulates the opening and closing of valve 21.

The temperature of the water entering tank 11 through port 22 is sensed by a thermostat 24, the function of which will be described more fully hereinafter.

A second outlet port 25 is provided on tank 11 which connects the tank lower section L with a secondary piping system 26 wherein supplemental heating of the circulating liquid is effected by solar means, superheating or other sources. The secondary piping system is connected to the primary piping system 18 upstream of pump 23. Liquid flow through piping system 26 is regulated by a solenoid activated valve 29, the operation of which is controlled by a thermostat 29a located within the lower section L near port 25.

The upper and lower storage sections U and L are interconnected by a passage assembly 27 which is externally mounted on the tank 11 and effects controlled circulation of the liquid from the upper section U to the lower section L of the tank interior so that a predetermined temperature differential may be substantially maintained between the liquid stored in each of the storage sections U and L. The assembly includes an outlet port 28 provided on the tank upper section, and inlet port 30 provided on the tank lower section, piping 31 connecting the two ports, and a thermostatically controlled circulating pump 32. The operation of pump 32 is regulated by thermostat 24 which is disposed adjacent port 22. Thus, when operating, the pump 32 will draw high temperature liquid from tank section U and discharge the liquid into the tank lower section L while the liquid therein remains in a relatively quiescent state. It has been noted that if the liquid accumulated in the lower section L, and in which the underside of chamber 13 is submerged, remains in a relatively quiescent state, the heat generated from the heater unit 12 will only penetrate the liquid accumulated in the lower section L to a depth of approximately 2"–3". Thus, for example, if it is desired to have the remainder of the liquid within the lower section L remain at a predetermined temperature (e.g. 130° F.), thermostat 24 will sense when the temperature of the accumulated liquid is below the predetermined amount and cause pump 32 to be actuated whereupon high temperature (e.g. 170° F.) liquid will be discharged into the lower section L until the temperature of the liquid in the lower section reaches the desired temperature (e.g. 130° F.).

As noted in FIG. 1, tank 11 is provided with a third outlet port 33 which connects the lower storage section L with a service piping system, not shown, wherein liquid initially at 130° F. is circulated to various auxiliary equipment included within said service piping system. The upper portion of tank 11 may also be provided with a primary cold (e.g. 50° F.) liquid inlet port 34 which communicates with the lower storage section L of the tank. In the illustrated embodiment both ports 33 and 34 are connected to extension pipes P which extend downwardly from the respective ports and terminate in lower section L. While ports 33 and 34 are shown located on the upper portion of the tank for easy access, particularly where the tank is located in a confined space, such ports are not limited to such locations but may be placed at various elevations on the side of the tank.

The introduction of the cold liquid into the tank interior may be into upper section U, rather than the lower section, if desired. In such an arrangement, the introduction of the cold liquid into the upper section near thermostat 16 will precipitate an early response by the heat source within chamber 13 when there has been a discharge of high temperature liquid through port 17 and thus, result in the stored liquid in the upper section quickly returning to the predetermined temperature.

FIG. 3 illustrates a modified cold liquid intake arrangement 35 wherein a cold liquid supply line 36 is connected to the inlet port 37a of a two-way valve 37. One outlet port 37b of the valve is connected by pipe section 38 to an inlet port 40 on tank 11 which communicates with the tank upper section U. Valve 37 is provided with a second outlet port 37c which is connected by a pipe section 41 to an inlet port 42 formed on tank 11 and communicating with the lower storage section L. Valve 37 is preferably solenoid operated and the solenoid therefor, not shown, may in turn by controlled by a temperature sensing device, not shown. In the FIG. 3 embodiment, the cold liquid inlet 34, shown in FIG. 1, is replaced by ports 40 and 42, shown in FIG. 3. Aside from this difference, the structures of the FIG. 1 and FIG. 3 embodiments are basically the same.

FIG. 2 is the basic wiring diagram for the improved system. The various components of the system such as solenoid switches, fans, pumps and the like are included in various sub-circuits I, II, III and IV connected in parallel to a power source, preferably of 240 V.A.C. In the illustrated embodiment, sub-circuit I includes thermostat 16, which may be set to open at 170° F. and close at 160° F., the heat source, not shown, and blower 14, all being connected in series; sub-circuit II includes thermostat 24, which may be set to open at 130° F. and close at 120° F., and pump 32 connected in series therewith; subcircuit III includes thermostat 29a, which may be set to open at 135° F. and close at 120° F., a relay 43 and solenoid valve 29, which are connected in series; and sub-circuit IV includes a relay 44 from a room thermostat, not shown, in series connection with pump 23. If desired, the various sub-circuits may include additional components, not shown, and also the number of sub-circuits may be increased.

Thus, an improved liquid heating and storage system has been disclosed wherein a single heating unit 12 is utilized to simultaneously maintain liquid stored within a single tank at two different predetermined temperatures. A passage assembly is mounted externally of the tank for effecting controlled circulation of high temperature liquid, drawn from the upper section of the tank interior, to intermix with lower temperature liquid stored in the lower section of the tank interior and thus, maintain a predetermined temperature differential between the liquid stored in the two tank interior sections. The improved system enables liquid at two different predetermined temperatures to be withdrawn from a single storage tank.

I claim:

1. A system for heating and storing a liquid, comprising a liquid storage tank; controlled heating means disposed at a predetermined level within said tank and immersed within the liquid accumulated therein, said heating means effecting controlled stratification of the tank interior into upper and lower liquid storage sections disposed, respectively, substantially above and below the level of said heating means, the liquid accumulated in said upper section being substantially at a first predetermined temperature and the liquid accumulated in said lower section being substantially at a lower second predetermined temperature; temperature sensitive first control means operatively connected to and controlling the operation of said heating means for substantially maintaining the liquid in said upper section at said first predetermined temperature; a liquid passage assembly interconnecting said upper and lower sections and including circulating means for controlled circulation of liquid from said upper section to said lower section; a first liquid outlet means communicating with said tank upper section; a second liquid outlet means communicating with said tank lower section; temperature sensitive second control means responsive to the liquid temperature in one of the tank sections whereby liquid substantially at said two predetermined temperatures is adapted to selectively flow through said outlet means from the tank interior; temperature sensitive third control means operatively connected to and controlling operation of said circulating means whereby a predetermined liquid temperature differential is substantially maintained between the liquid accumulated within the upper and lower sections; and inlet means communicating with at least one of the tank sections for introducing liquid into the tank interior at a temperature lower than either of said predetermined temperatures.

2. The system of claim 1 wherein the volumetric capacity of the tank interior lower section is at least one third the total tank interior volumetric capacity.

3. The system of claim 1 wherein the first control means is disposed within the tank interior upper section.

4. The system of claim 1 wherein the first liquid outlet means communicates with a primary external piping system, and the second liquid outlet means communicates with a secondary external piping system.

5. The system of claim 4, wherein the liquid inlet means communicates with the lower section of the tank interior.

6. The system of claim 4, wherein the liquid inlet means includes means for distributing incoming liquid in the tank interior lower section while the liquid within said lower section remains in a substantially quiescent state.

7. The system of claim 1 wherein the heating means includes an elongate chamber formed of heat conductive liquid imperious material extending substantially cross-wise of the tank interior and having at least one end thereof vented to the tank exterior; and means for heating the interior of said chamber.

8. The system of claim 1 wherein the third control means is responsive to the temperature of the liquid accumulated in the tank lower section.

* * * * *